April 16, 1957   L. E. TANK   2,788,614
HOTBED BOX
Filed April 9, 1954

INVENTOR.
LAWRENCE E. TANK
BY
*Billy J. Corker*

United States Patent Office 2,788,614
Patented Apr. 16, 1957

2,788,614

HOTBED BOX

Lawrence E. Tank, Baltimore, Md., assignor to Aircraft Armaments, Inc., Baltimore, Md., a corporation of Maryland Application April 9, 1954, Serial No. 422,228

6 Claims. (Cl. 47—19)

This invention relates to a portable hotbed box which is adapted to seat against a window within a heated building, such as in the basement of a home, for growing seedlings and rooting cuttings. A temperature differential for accelerating the growth of a plant in the hotbed is effected by employing a thin metal sheet, or other material having good heat conductivity, for the back of the box, whereby the warmth of the air inside the room is transmitted to the plant propagating medium, such as sand, and the air within the box is cooled by radiation through the window to the colder outside air and by radiation to the window.

An object of this invention is to provide a small portable hotbed for growing seedlings and rooting cuttings, wherein the desired temperature differential for promoting root growth is obtained without the use of auxiliary heating units.

Another object of this invention is to provide a hotbed which may be conveniently used by an ordinary home dweller by mounting the box adjacent a window, such as a basement window in the home.

Another object of this invention is to provide a hotbed which is so constructed that the plants are directed towards the sunlight whereby straight growth is encouraged.

Still another object of this invention is to provide a hotbed box which is economical to manufacture and which may be easily assembled.

Further and other objects will become apparent from a reading of the following description, especially when considered in combination with the accompanying drawings, wherein like numerals refer to like parts.

Figure 1:
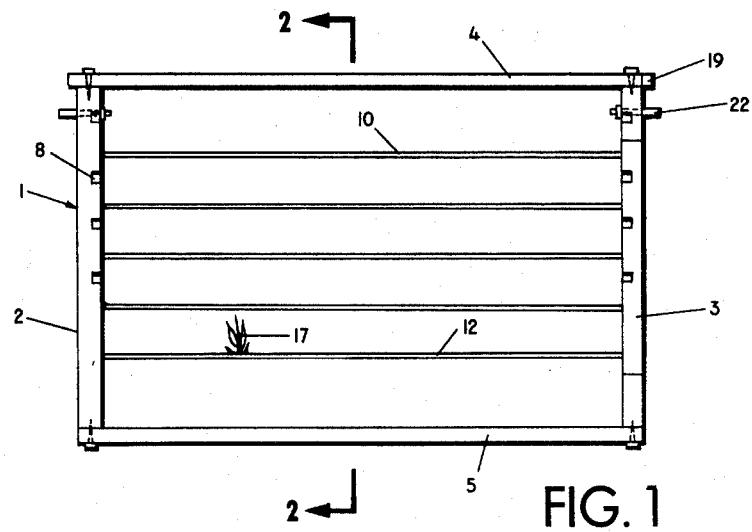
Fig. 1 is a front view of the hotbed box.
Figure 2:
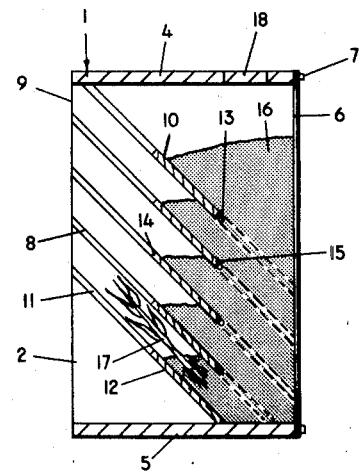
Fig. 2 is a sectional view taken on line 2—2 of Fig. 1.

Referring to Figs. 1 and 2, the hotbed comprises an open front box 1 having wooden sides 2 and 3 joined by top and bottom wooden panels 4 and 5, respectively. The back 6 of box 1, of metal or other suitable material having good heat conducting properties, is secured to sides 2 and 3 and to the upper and lower panels 4 and 5 by suitable fastening means such as screws 7. A plurality of grooves 8 are formed in the inner wall of each side 2 and 3 of box 1, which are generally parallel to one another and slope rearwardly and downwardly from the front 9 of the box. A plurality of wooden partition members 10 are slidably received within corresponding grooves 8 in sides 2 and 3 to provide a plurality of shelf-like sections within the hotbed. The lowermost groove 11 in sides 2 and 3 is arranged to terminate at the bottom panel intermediate of the front and back of box 1, whereby partition member 12 will seatingly engage bottom panel 5 at a location spaced from back 6. The other partition members 10 are held within slots 8 directly above partition member 12 and spaced from back 6 by means of projections 13 which may simply be nails driven through wooden sides 2 and 3. As best shown in Fig. 2, the upper end 14 of one partition member is above the lower end 15 of the partition member immediately above it, whereby sand 16, or other suitable plant propagating medium, may be placed in the box and confined in the back portion thereof, leaving the space in front of the partition members open and, at the same time, providing sand at each of the vertically arranged spaces between the partition members. A plurality of rows of sand are thus provided, one above the other, for planting seeds or cuttings 17.

A section 18 of upper panel 4 adjacent back 6 of the box is made readily removable to provide an opening for adding moisture to sand 16 as required for proper plant propagation. Section 18 of upper panel 4 projects beyond sides 2 and 3, as shown in Fig. 1, to provide handles 19 for easily and quickly removing and replacing the section.

Figure 3:
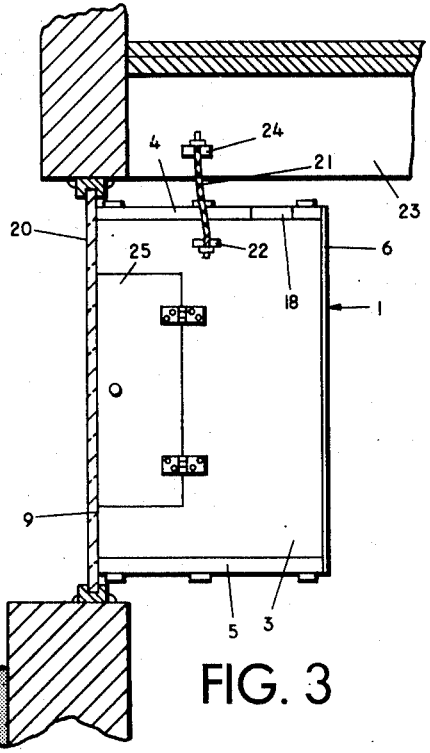
Fig. 3 is a side view of the hotbed box shown mounted in a window.

As shown in Fig. 3, box 1 is adapted to be supported so as to rest against a glass window 20 such that the window serves to close the open end 9 of the box and allow radiation to the colder outside air and to the window which is itself cooled by the outside air to effectively cool the air within the box. Any suitable means for supporting the box 1 may be employed, one such means being shown in Fig. 3 as a flexible cord 21 secured to box 1 through a U-bolt 22 and to floor joist 23 through a second U-bolt 24.

On warm spring days, when the hotbed is in use, direct sunlight through glass 20 may warm the air within box 1 to a temperature which is actually higher than the air surrounding the box, in which case it is obviously desirable to allow circulation of air between the inside and outside of the box. This may be done by moving the box away from the window an inch or so, or by providing a door 25 in the side of box 1 which may be opened. In the night-time, however, and during the day when the sun's rays are not directly contacting glass 20, the cooler outside air will maintain the air within box 1 cooler than the sand temperature which is controlled by the temperature of the air surrounding the box by virtue of the thin metal back 6.

In using the hotbed box, sand or other suitable material, is placed therein, as shown in Fig. 2, through the opening provided by removing section 18 of upper panel 4, then plant seeds or cuttings, whichever is to be propagated, are inserted into the sand, or the like, between the partition members 10. In the case of cuttings, they are inserted so as to extend generally parallel with the partition members. The sand, or the like, is then moistened as desired and upper panel section 18 is placed in position, closing the opening. Then box 1 is raised into position with the open front of the box engaging a window pane within a heated building, such as the basement of a home and suitably supported in this position by means such as cords 21, as shown in Fig. 3. The warm air of the heated room is transmitted through thin metal back 6 of box 1 to maintain the temperature of the sand, or the like, at substantially the temperature of the air surrounding the box. The sides and top and bottom panels of box 1, as well as the partition members, being made of wood, a relatively good heat insulator, traps the cooler air radiated from the window pane to maintain the air within the box substantially cooler than the sand. Normally the air temperature inside box 1 will be near the outside air temperature except when the sun's rays are striking directly on the window pane. The temperature differential thus obtained accelerates the root growth of the seedling or cutting and retards the plant growth such that a hardy plant is obtained. Tests indicate that in the case of most soft wood cuttings the root growth will be sufficient for transplanting the cutting within approximately ten days and in the case of seedlings a somewhat longer period is required, depending upon the size of the plant desired for transplanting.

Should the window location for the hotbed be such that direct sunlight will be received during certain hours of the day it may be necessary to provide ventilation, as previously described, to maintain the air temperature in box 1 from reaching a value which will damage the plants growing therein. At these periods during the day when the box should be ventilated there will obviously not be a temperature differential for accelerating root growth, however, this will occur only a few hours during the day and then only if the window location is such as to receive direct sunlight.

It is to be understood that certain alterations, modifications and substitutions may be made to the instant disclosure without departing from the spirit and scope of this invention as defined by the appended claims.

I claim:

1. A hotbed for accelerating the root growth of seedlings and cuttings comprising, an open front box, the back of said box being a thin sheet of material having good heat conducting properties, a plurality of vertically spaced partition members secured to and extending between the side walls of said box intermediate the front and back thereof, said partition members sloping rearwardly and downwardly relative to the front of said box, the lowermost partition member engaging the bottom wall of said box whereby loose plant propagating material will be retained in the box between said partition members and the back of the box to provide a plurality of rows arranged one above the other for growing plants, and means carried by said box for supporting the same so that the front of the box rests against a window within a heated room.

2. A hotbed for accelerating the root growth of seedlings and cuttings comprising, an open front box, the sides of said box being a relatively poor conductor of heat, the back of said box being a relatively good conductor of heat, a plurality of vertically spaced partition members carried within said box for confining loose plant propagating material between said partition members and the back of the box and to provide a plurality of rows for growing plants, and means connecting with said box for supporting the same so that the open front thereof rests against a window within a heated room.

3. A hotbed for growing seedlings and rooting cuttings inside a heated room having a window communicating with the outside air comprising, a box having the front thereof open and arranged to face the window whereby the air temperature within the box is primarily controlled by the outside air temperature, the sides of said box providing heat insulation between the inside and outside of said box, and a partition member carried within said box for confining a suitable plant propagating medium between the partition member and the back of said box for planting seeds or cuttings, the back of said box being material having good heat conducting properties whereby the temperature of said plant propagating medium is primarily controlled by the temperature of the heated room.

4. A hotbed for growing seedlings and rooting cuttings inside a heated room having a window communicating with the outside air comprising, a box having the front thereof open and arranged to face the window whereby the air temperature within the box is primarily controlled by the outside air temperature, said box having wooden sides for insulating the inside thereof from the heated room, a plurality of vertically spaced wooden partition members carried within said box and arranged to slope rearwardly and downwardly relative to the front and top of the box, and a bottom partition member engaging the back wall of said box whereby a plant propagating medium is confined between the partition members and the back of the box to provide a plurality of rows arranged one above the other for growing plants, the back of said box being a metal sheet whereby the temperature of the plant propagating medium is primarily controlled by the temperature of the heated room.

5. A hotbed for accelerating the root growth of plant seedlings and cuttings which is adapted for use inside a room having a window communicating with cooler outside air comprising, a box having the front thereof open and arranged to face the window whereby the air temperature within the box is primarily controlled by the outside air temperature, said box having insulated sides providing low heat transfer losses therethrough, a plurality of vertically spaced partition members carried within said box and extending between the sides thereof and arranged to slope rearwardly and downwardly relative to the front and top of said box, said partition members being spaced from each other and from the back of said box to supply loose plant propagating material in rows for growing plants from a common material supply carried between the partition members and the back of the box, the lowermost partition member engaging the bottom wall of said box whereby the loose plant propagating material is confined between said partition members and the back of the box, the back of said box being a relatively good conductor of heat whereby the temperature of the plant propagating material is primarily controlled by the temperature of the heated room.

6. A hotbed for accelerating the root growth of plant seedlings and cuttings which is adapted for use inside a heated room having a window communicating with the outside air comprising, a box having the front thereof open and arranged to face the window whereby the air temperature within the box is primarily controlled by the outside air temperature, said box having wooden sides for insulating the inside thereof from the heated room, the wooden side walls of said box having a plurality of spaced grooves cut therein sloping rearwardly and downwardly relative to the front and top of said box, heat insulating partition members carried by said grooves within said box and arranged one above the other intermediate of the front and back of the box for retaining loose plant propagating material between the partition members and the back of the box and to provide a plurality of spaces for inserting plants into the propagating material from the front of the box, the lowermost partition member engaging the bottom wall of said box, the back of said box being a relatively good conductor of heat whereby the temperature of the plant propagating material is primarily controlled by the temperature of the heated room, and closure means formed in the top of said box providing an opening for watering the plant propagating material.

References Cited in the file of this patent

UNITED STATES PATENTS

| | | |
|---|---|---|
| 1,214,057 | Moore | Jan. 30, 1917 |
| 1,217,239 | Swartz | Feb. 27, 1917 |

FOREIGN PATENTS

| | | |
|---|---|---|
| 86,200 | Sweden | Apr. 28, 1936 |
| 611,675 | Great Britain | Nov. 2, 1948 |